(12) United States Patent
Liebelt

(10) Patent No.: US 9,783,098 B2
(45) Date of Patent: Oct. 10, 2017

(54) COMMODITY TRAILER WORKING AREA LIGHTING SYSTEM

(71) Applicant: STI Holdings, Inc., Stoughton, WI (US)

(72) Inventor: Jeffrey Wayne Liebelt, Janesville, WI (US)

(73) Assignee: STI Holdings, Inc., Stoughton, WI (US)

(*) Notice: Subject to any disclaimer, the term of this patent is extended or adjusted under 35 U.S.C. 154(b) by 70 days.

(21) Appl. No.: 14/613,646

(22) Filed: Feb. 4, 2015

(65) Prior Publication Data

US 2015/0224918 A1    Aug. 13, 2015

Related U.S. Application Data

(60) Provisional application No. 61/937,099, filed on Feb. 7, 2014.

(51) Int. Cl.
*B60Q 1/00* (2006.01)
*B60Q 1/24* (2006.01)

(52) U.S. Cl.
CPC ............. *B60Q 1/24* (2013.01); *B60Q 1/0035* (2013.01)

(58) Field of Classification Search
CPC ............ B60Q 1/24; B60Q 1/0035; B60P 1/56
USPC .............................. 362/485; 298/24; 105/247
See application file for complete search history.

(56) References Cited

U.S. PATENT DOCUMENTS

| | | | | |
|---|---|---|---|---|
| 5,573,327 A * | 11/1996 | Dealey, Jr. | ............... | B60Q 3/06 362/328 |
| 6,142,554 A * | 11/2000 | Carroll | ..................... | B60J 7/062 296/100.11 |
| 8,550,542 B1 * | 10/2013 | Booher | ................ | B62D 33/023 296/183.1 |
| 2005/0161994 A1 * | 7/2005 | Heider | ..................... | B60P 1/56 298/27 |
| 2008/0219015 A1 * | 9/2008 | Kolstee | ................ | B60Q 1/0088 362/487 |
| 2013/0135880 A1 * | 5/2013 | Michie | ................. | B60Q 1/2611 362/459 |
| 2013/0141927 A1 * | 6/2013 | Kenyon | ............... | B60Q 1/0035 362/485 |
| 2014/0160776 A1 * | 6/2014 | Sura | ....................... | B60Q 3/007 362/485 |
| 2015/0203026 A1 * | 7/2015 | Schotanus | ................ | B60Q 1/24 362/520 |

* cited by examiner

*Primary Examiner* — Sean Gramling
(74) *Attorney, Agent, or Firm* — Michael Best & Friedrich LLP

(57) ABSTRACT

A commodity trailer for storage and transport of a commodity, and provided with a lighting system. The commodity trailer can include a tub in which the commodity is stored and transported, wherein the tub includes at least one wall that is sloped from a first elevation to an opening beneath the tub at a second elevation lower than the first elevation to funnel the commodity toward the opening, and wherein the opening has a plurality of sides; a frame extending along at least one side of the opening; and a lamp mounted to the frame, wherein the lamp is positioned and oriented to direct light upon an area beneath the opening into which commodity from the tub flows upon exiting the opening.

19 Claims, 11 Drawing Sheets

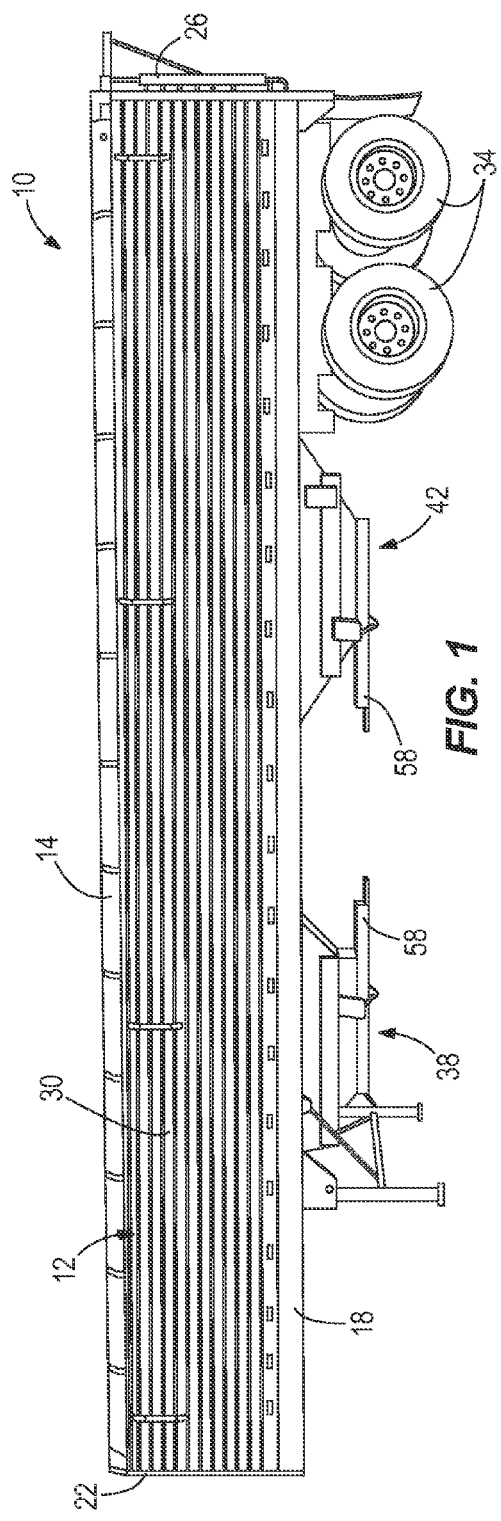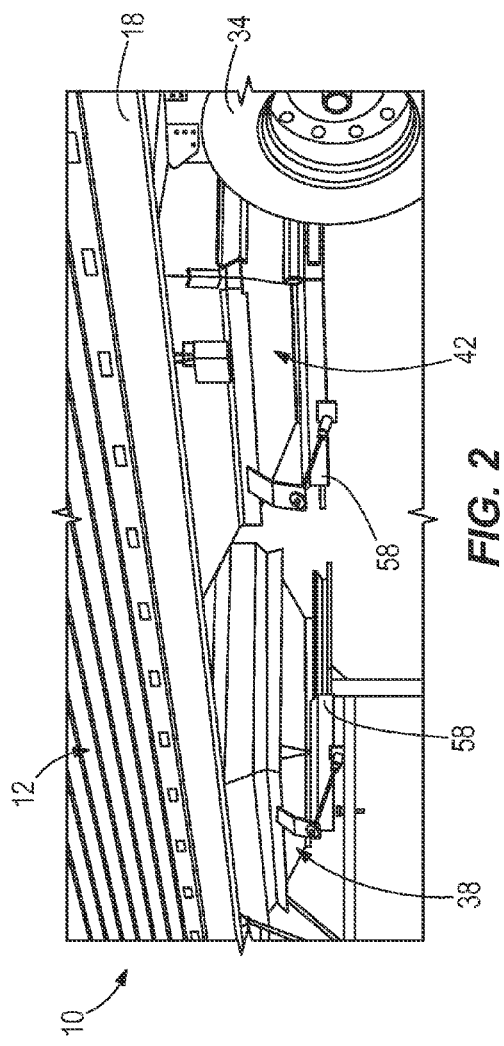

COMMODITY TRAILER WORKING AREA LIGHTING SYSTEM

CROSS-REFERENCE TO RELATED APPLICATIONS

This application claims priority to U.S. Provisional Application No. 61/937,099, filed Feb. 7, 2014, the entire contents of which are incorporated herein by reference.

FIELD OF THE INVENTION

The present invention relates to commodity trailers, and specifically to lighting systems for commodity trailers.

BACKGROUND OF THE INVENTION

Commodity trailers are often used to haul a grain or other harvested commodity (e.g., corn and soybean) in and around a farm and/or over a road. The trailers can be of a monocoque or semi-monocoque construction having walls and one or more tubs constructed between the walls that carry and support the commodity. Each tub has walls that are sloped from a larger opening at a middle or top of the tub to a smaller opening at a bottom of the tub. Each tub includes a door at the bottom of the tub that opens partially or fully to allow the commodity to unload and flow out of the tub at a desired rate into a pit, or into a piece of farm equipment that transfers the commodity to a storage location.

The trailers are often unloaded in dark locations and environments. In order to have control over the flow of the commodity, current commodity trailers incorporate the use of after-market work lights that are ordered and then installed on the commodity trailers. The work lights can be mounted on the frame of the commodity trailer, and can be powered with auxiliary power from a tractor coupled to the trailer (i.e., with an extra plug) or in another manner. While the use of such work lights provides some lighting, the lighting is often dimmed, reduced, or obscured due to the location and orientation of the work lights and the shadows that are formed underneath the commodity trailer. Additionally, the use of such work lights is costly, requires extra time to install and implement, and must often be significantly modified or adapted for installation on each unique commodity trailer.

In light of the shortcomings of existing lighting systems used in conjunction with commodity trailers, improved commodity trailer lighting systems continue to be welcome additions to the art.

SUMMARY OF THE INVENTION

According to one construction, a commodity trailer includes a body having a top side and a bottom side, and a tub coupled to the body and disposed at least partially beneath the bottom side, the tub including walls that are sloped from a larger opening at a top of the tub to a smaller opening at a bottom of the tub, the smaller opening being defined partially by a lip that extends in a direction along a width of the trailer, the tub also including a door that opens and closes over the smaller opening. The trailer also includes a stop member disposed adjacent the lip that stops movement of the door in one direction, the stop member extending in a direction along the width of the trailer. The trailer also includes a commodity trailer working area lighting system including an enclosure disposed adjacent the stop member, the enclosure extending in a direction along the width of the trailer, the enclosure having a plurality of LED lamps disposed therein that emit light out of the enclosure directly below the stop member and into an area directly below the lip and smaller opening to provide viewing of material falling out of the smaller opening.

According to another construction, a commodity trailer includes a body having a top side and a bottom side, and a tub coupled to the body and disposed at least partially beneath the bottom side, the tub including walls that are sloped from a larger opening at a top of the tub to a smaller opening at a bottom of the tub, the tub also including a door that opens and closes over the smaller opening. The trailer also includes a commodity trailer working area lighting system including an elongate enclosure disposed adjacent the smaller opening, the enclosure extending in a direction along a width of the trailer, the enclosure including an angled surface with a plurality of openings through which LED lamps extend and emit light. The enclosure further includes sidewalls extending from the angled surface, and a cover that couples over the sidewalls to at least substantially enclose each of the LED lamps within the enclosure.

According to another construction, a commodity trailer includes a body having a top side and a bottom side, and a tub coupled to the body and disposed at least partially beneath the bottom side, the tub including walls that are sloped from a larger opening at a top of the tub to a smaller opening at a bottom of the tub, the smaller opening being defined partially by a lip that extends in a direction along a width of the trailer, the tub also including a door that opens and closes over the smaller opening. The commodity trailer also includes an integrated commodity trailer working area lighting system disposed adjacent the lip that includes a plurality of LED lamps that emit light directly below the smaller opening adjacent the lip.

According to another construction, a commodity trailer for storage and transport of a commodity is provided, and comprises a tub in which the commodity is stored and transported, wherein the tub includes at least one wall that is sloped from a first elevation to an opening beneath the tub at a second elevation lower than the first elevation to funnel the commodity toward the opening, and wherein the opening has a plurality of sides. A frame extends along at least one side of the opening, and a lamp is mounted to the frame and is positioned and oriented to direct light upon an area beneath the opening into which commodity from the tub flows upon exiting the opening.

According to another construction, a commodity trailer for storage and transport of a commodity over ground is provided and comprises a tub in which the commodity is stored and transported, wherein the tub includes at least one wall that is sloped from a first elevation to an opening beneath the tub at a second elevation lower than the first elevation to funnel the commodity toward the opening, and where the opening has a plurality of sides. A lamp is secured in place with respect to the opening, and is positioned and oriented to direct light upon an area beneath the opening into which commodity from the tub flows upon exiting the opening.

According to another construction, a lighting system for a commodity trailer having a tub in which commodity is stored and transported over ground is provided, and comprises an elongated beam having a cross sectional shape that includes a mounting flange shaped to secure the elongated beam in a position adjacent a tub, and a body extending away from the mounting flange; and a light mounted to the body of the elongated beam; wherein the elongated beam is shaped to orient the light at an oblique angle with respect to the ground when the elongated beam is secured in the position adjacent the tub via the mounting flange.

According to another construction, a commodity trailer in which a commodity is stored and transported over ground is provided and comprises a body having a top side, a bottom side, and side walls extending between the top side and the bottom side, wherein the top side, bottom side, and side walls at least partially define an interior of the body; a tub in which the commodity is stored and transported, the tub including at least one wall that is sloped from a first elevation to an opening beneath the tub at a second elevation lower than the first elevation to funnel the commodity from the interior of the body toward the opening; a plurality of wheels coupled to the bottom side of the body; a plurality of top rails proximate the top side of the body and collectively at least partially defining a rectangular periphery of the top side; and a light coupled to at least one of the top rails and positioned to direct light downward into the interior to illuminate the tub from within the commodity trailer.

Other features and aspects of the invention will become apparent by consideration of the following detailed description and accompanying drawings.

BRIEF DESCRIPTION OF THE DRAWINGS

FIG. 1 is a side view of a commodity trailer according to one construction of the invention.

FIG. 2 is a bottom perspective view of the commodity trailer of FIG. 1, illustrating two tubs and doors.

FIG. 15 is a rearwardly-directed perspective view of the underside of a commodity trailer, illustrating three LEDs of the commodity trailer working area lighting system turned on.

Figure 3:
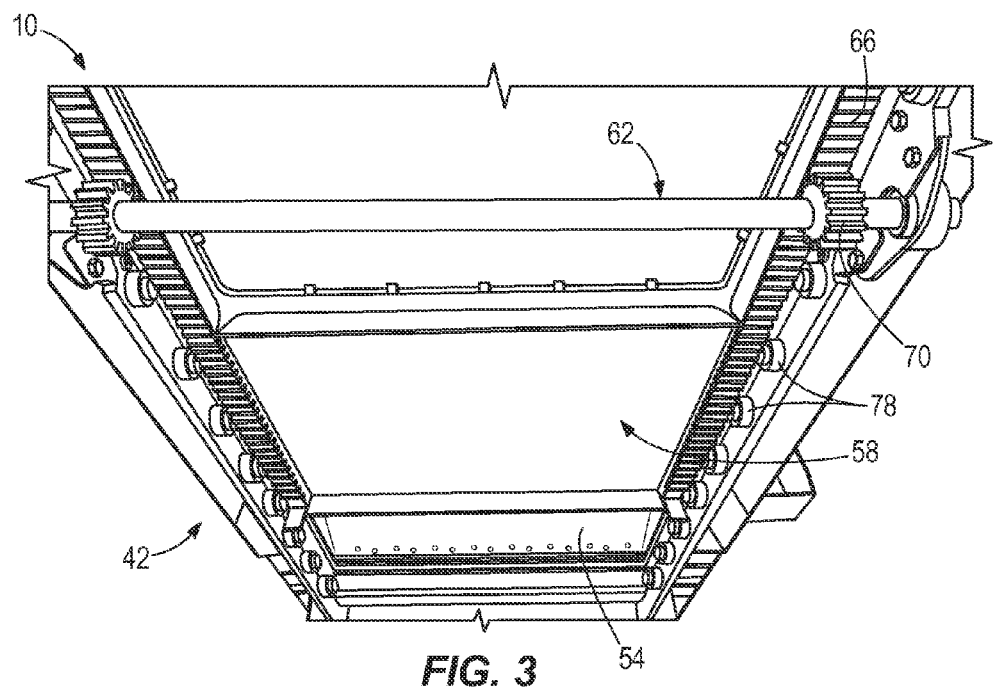
FIG. 3 is a bottom perspective view of the commodity trailer of FIGS. 1 and 2, illustrating one of the tubs and doors, the door being partially open.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-5 illustrate a commodity trailer 10. The illustrated trailer 10 is for hauling grain or other types of commodities, and includes a body 12 having top side 14, a bottom side 18, a front end 22, a back end 26, and a plurality of side walls 30 extending between the top side 14 and the bottom side 18. The trailer 10 further includes a set of wheels 34 coupled to and disposed beneath the bottom side 18, as well as a front tub 38 and a rear tub 42 (e.g., hoppers) coupled to the body 12 and disposed at least partially beneath the bottom side 18, the rear tub 42 being disposed between the wheels 34 and the front tub 38.

Figure 4:
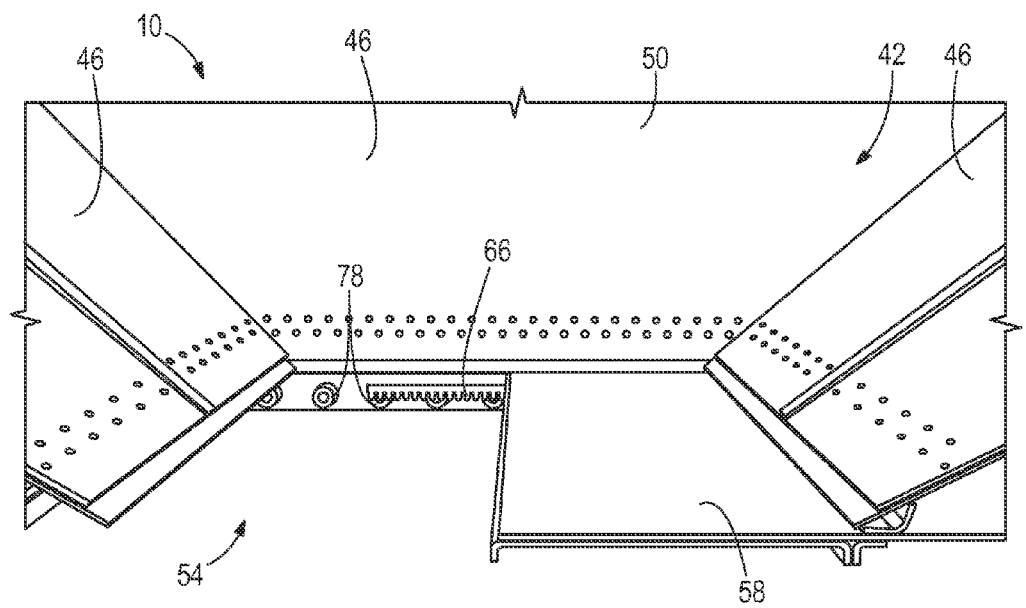
FIGS. 4 and 5 are top perspective views of one of the tubs and doors of the commodity trailer of FIGS. 1-3, the door being partially open.
Figure 5:
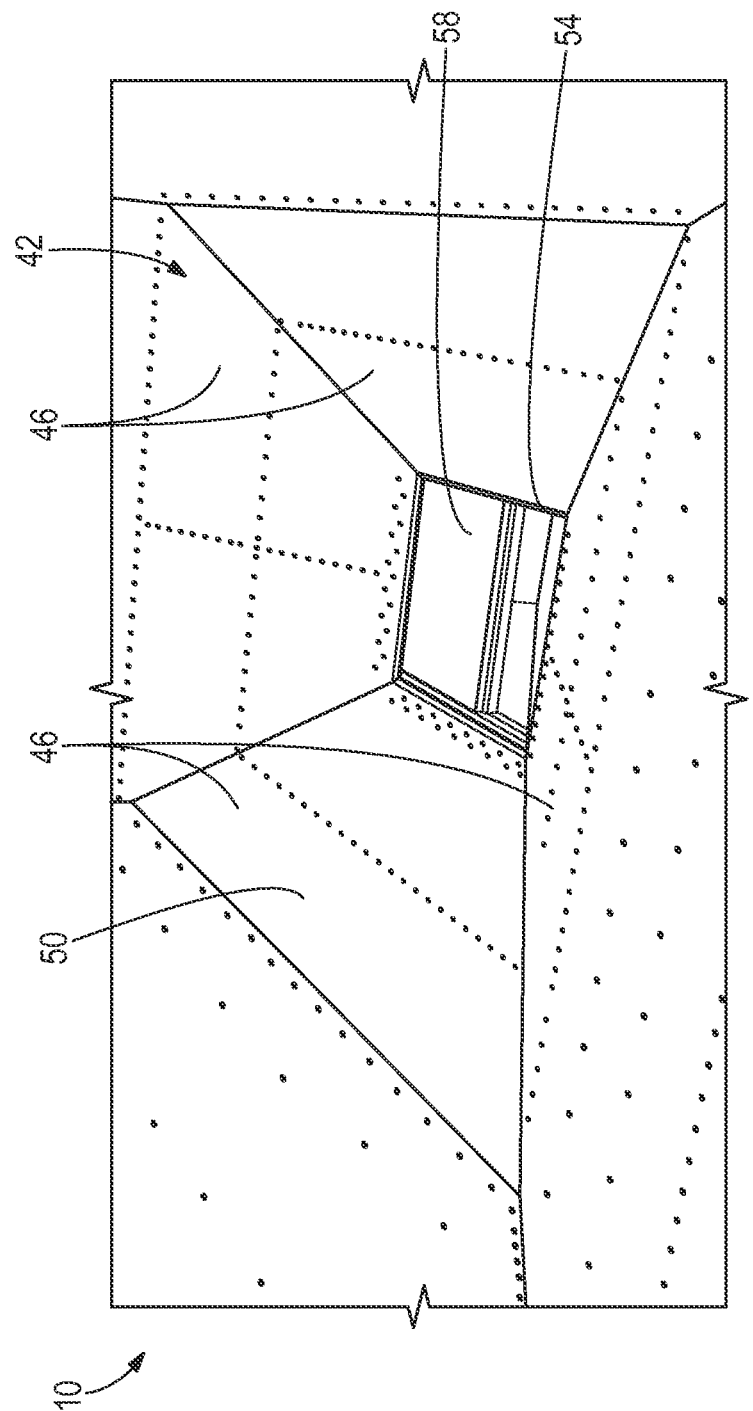

With continued reference to FIGS. 4 and 5, both the front tub 38 and the rear tub 42 include walls 46 that are sloped from a larger opening 50 at a top of the tub 38, 42 to a smaller opening 54 at a bottom of the tub 38, 42. In other embodiments, the tubs 38, 42 can be differently shaped while still having at least one wall oriented at an oblique angle (e.g., with respect to ground) in order to funnel commodity toward the opening 54. In such embodiments, the angled wall(s) need not necessarily extend fully to the top and/or bottom of the tub 38, 42. With reference to FIGS. 4 and 5, each tub 38, 42 further includes a door 58 at the bottom of the tub 38, 42 that opens partially or fully over the opening 54 to allow the commodity to unload and flow out of the tub 38, 42 at a desired rate into a pit, into a piece of farm equipment, or into another structure or environment.

Figure 11:
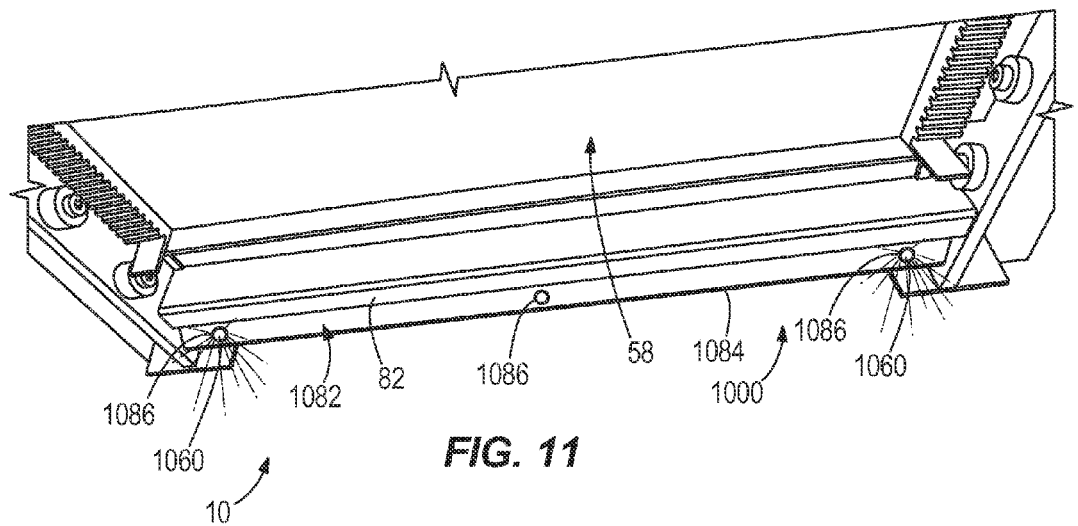
FIGS. 11 and 12 are bottom perspective views of a commodity trailer, illustrating LED lamps of the commodity trailer working area lighting system, and openings for the LED lamps.
Figure 12:
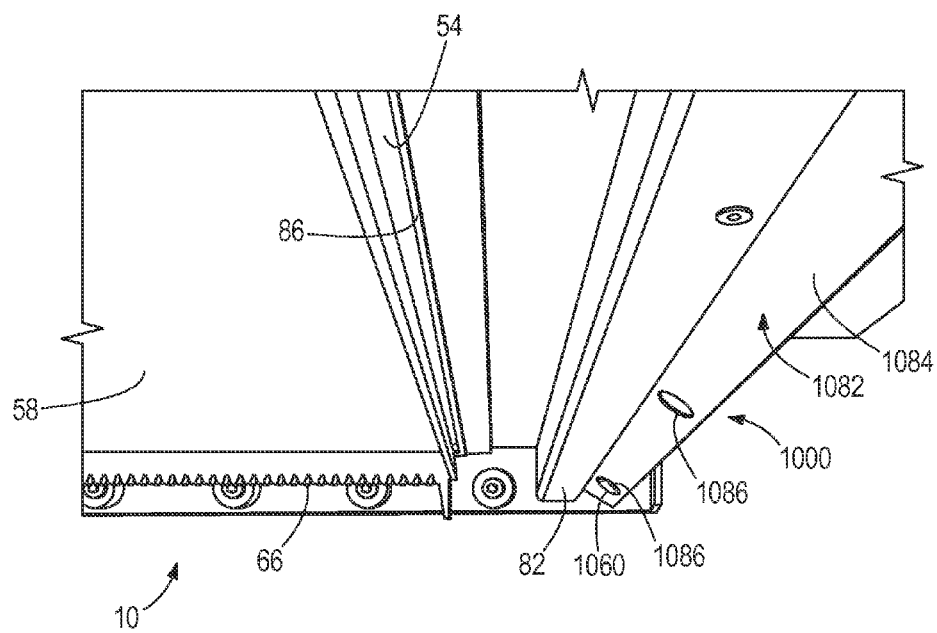
Figure 13:
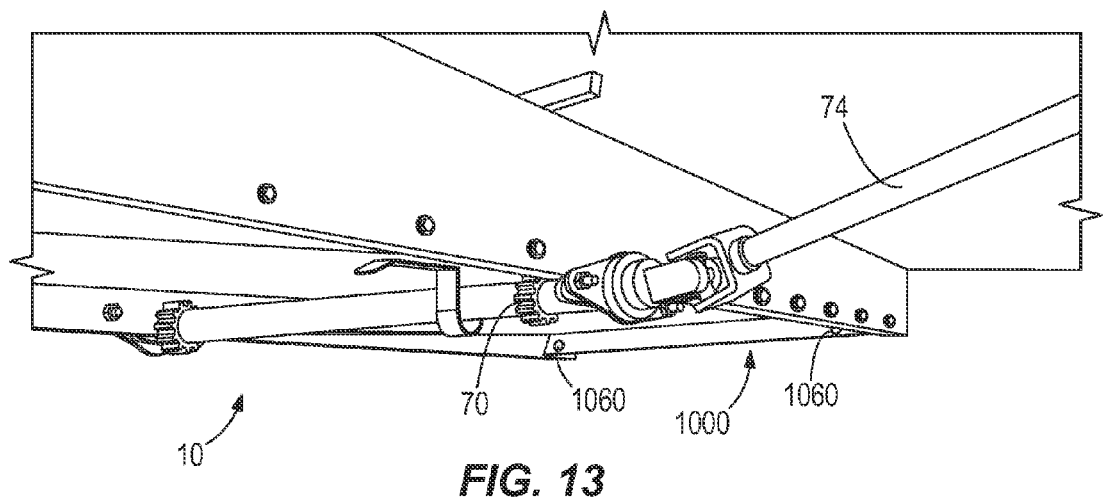
FIG. 13 is a bottom perspective view of the commodity trailer of FIGS. 11 and 12, illustrating LED lamps of the commodity trailer working area lighting system, and a door crank used to open to the door.

With reference to FIGS. 3, 4, and 11-13, the trailer 10 includes a door opening structure 62 for each tub 38, 42 to open and close the doors 58. In the illustrated construction, the door opening structure 62 is a rack and pinion mechanism with a geared rack 66 on the door 58 and pinion 70 coupled to the rack 66. As illustrated in FIG. 13, a driving member 74 (e.g., door crank) is coupled to the pinion 70 to turn the pinion 70. As the pinion 70 is turned, the rack 66 is moved and the door 58 slides over a set of bosses or rollers 78 (as illustrated in FIGS. 3 and 4) either toward the front end 22 of the trailer 10 or the back end 26. The door 58 on the tub 38 slides toward the back end 26 to open and toward the front end 22 to close. Conversely, the door 58 on the tub 42 slides toward the front end 22 to open and toward the back end 26 to close. In other embodiments, the doors 58 can be positioned to open in any direction desired, such as moving in opposite directions to those just described, both doors 58 moving forward to open and rearward to close, both doors 58 moving rearward to open and forward to close, and even door(s) 58 moving sideways (i.e., laterally with respect to a direction of travel of the commodity trailer) or pivoting to open and close.

Figure 6:
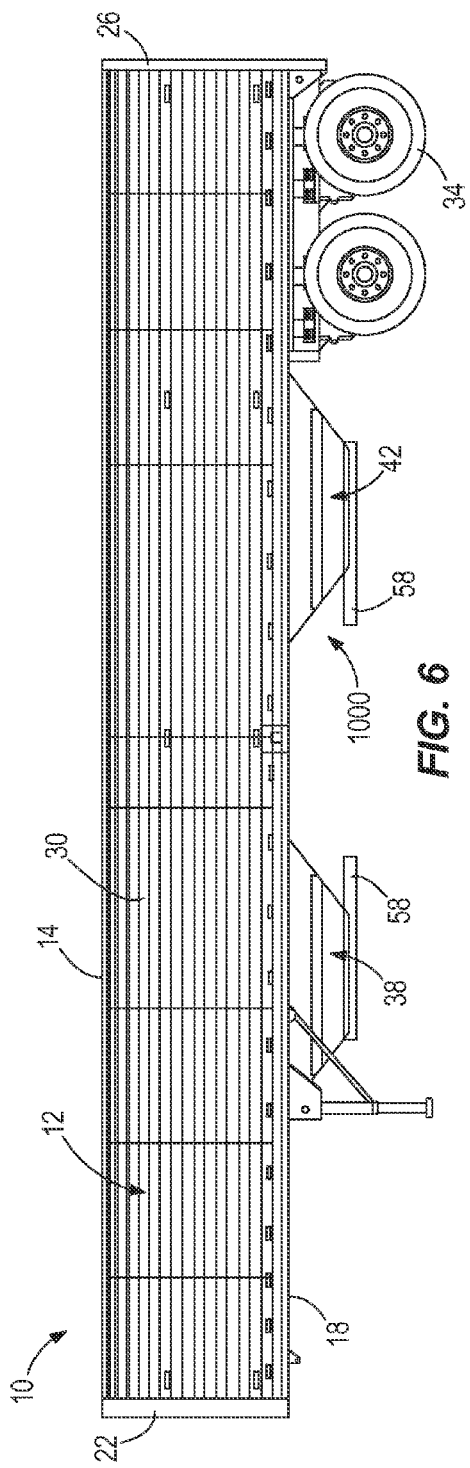
FIG. 6 is a side view of a commodity trailer, illustrating a commodity trailer working area lighting system according to one construction of the invention integrated into the commodity trailer.

With reference to FIGS. 11 and 12, each door 58 of the illustrated trailer 10 has an associated stop member 82 that stops movement of the door 58 toward a closed position. In the illustrated embodiments, the stop members 82 are elongate protrusions that extend along a width of the trailer (i.e., in a direction into and out of the page of FIG. 6). As illustrated in FIG. 12, the stop member 82 is disposed adjacent a lip 86 that partially defines the opening 54, the lip 86 also extending along a width of the trailer 10. Other constructions include different structures and arrangements for opening and closing the doors 58.

With reference to FIGS. 6-17, the trailer 10 also includes a commodity trailer working area lighting system 1000. The illustrated commodity trailer working area lighting system 1000 is coupled to the trailer 10 in an integrated manner during manufacture of the trailer 10, such that the commodity trailer working area lighting system 1000 comes as standard equipment on the trailer 10. In other constructions the lighting system 1000 is applied as a retro-fit to existing commodity trailers.

Figure 7:
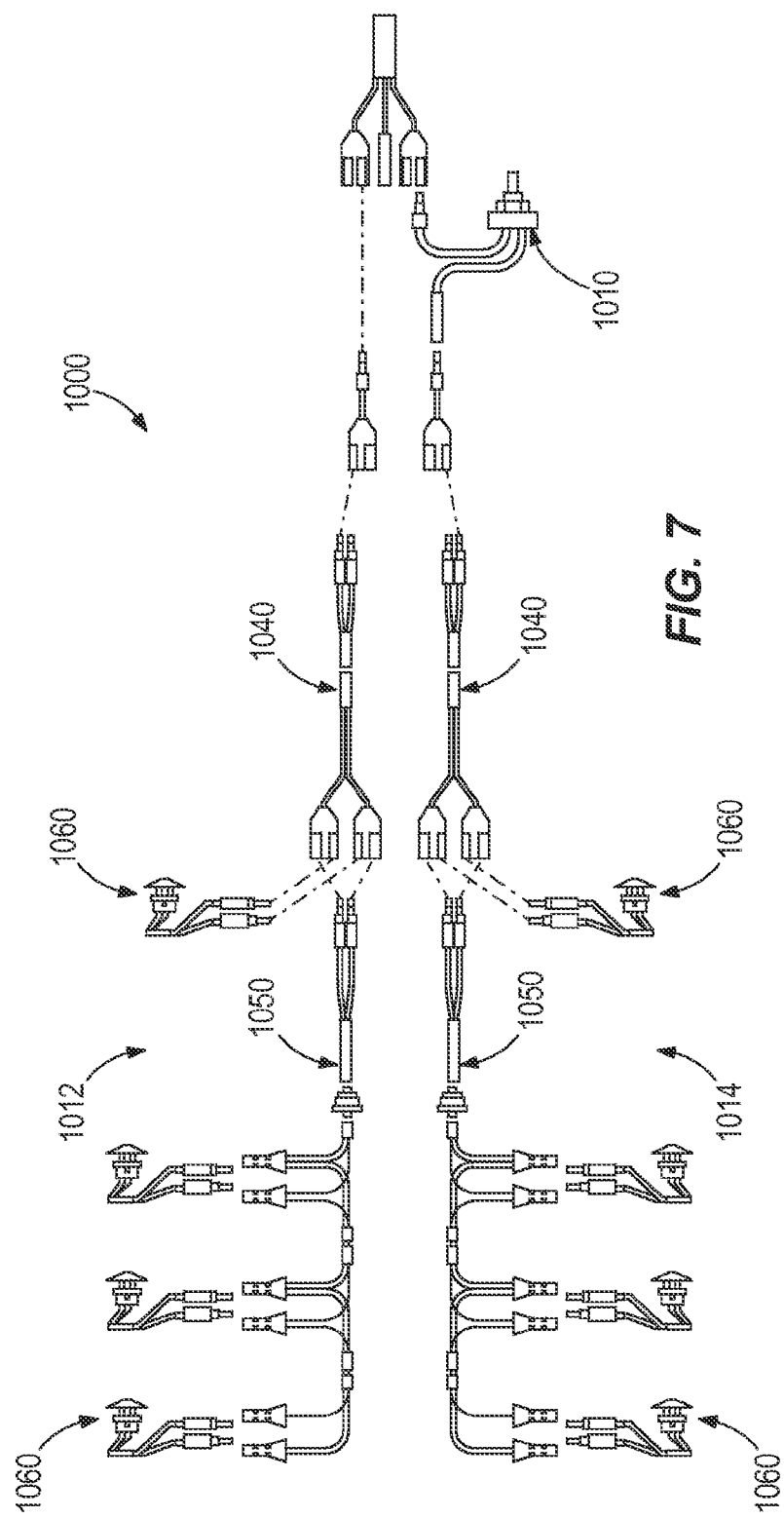
FIG. 7 is a schematic, exploded view of a portion of the commodity trailer working area lighting system, illustrating a switch and two harnesses coupled to the switch, each harness having multiple LED lamps.
Figure 10:
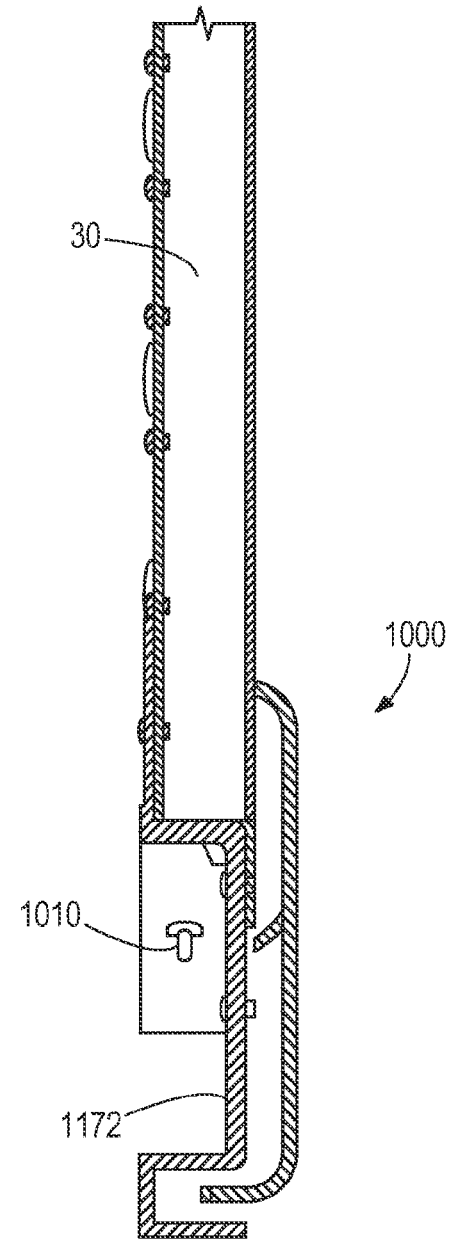
FIG. 10 is a cross-sectional view of another portion of the commodity trailer working area lighting system FIGS. 6-9, illustrating a switch disposed along a bottom rail of the commodity trailer.
Figure 14:
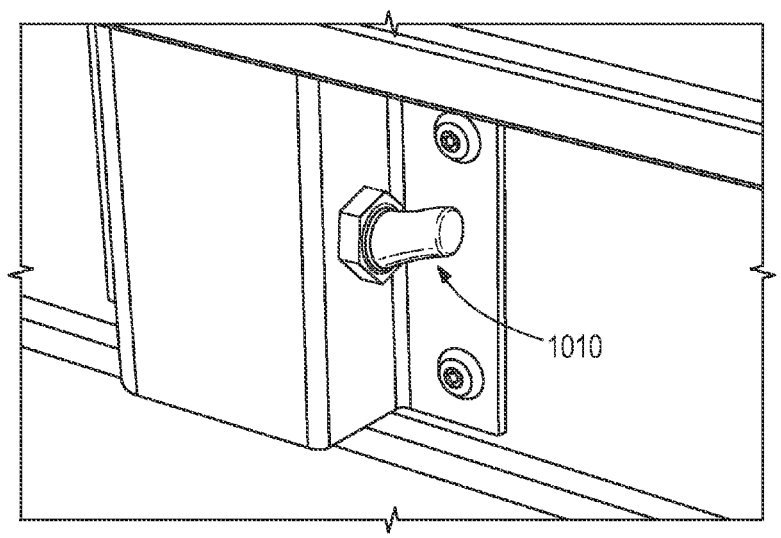
FIG. 14 is a perspective view of an embodiment of the switch of FIG. 10 used to control the commodity trailer working area lighting system.

With reference to FIGS. 7, 10 and 14, the illustrated commodity trailer working area lighting system 1000 includes a switch 1010. The switch 1010 is a weatherproof toggle switch. As illustrated in FIG. 10, the switch 1010 is disposed generally along a bottom of one of the walls 30 (e.g., between the front tub 38 and the rear tub 42). More specifically, the switch 1010 in the illustrated embodiment is located in a recess in a bottom rail 1172 (described further below) of the wall 30. The bottom rail 1172 runs along a length (e.g., substantially the entire length) of the commodity trailer 10. Other constructions include different locations for the switch 1010.

With reference to FIG. 7, the switch 1010 is coupled to both a front harness 1012 and a rear harness 1014, although the switch 1010 can be coupled to any number of different harnesses as desired, such as a single harness for powering a lighting system 1000 for a single tub 38, 42, a single harness for powering a lighting system 1000 for two or more tubs 38, 42 in series, or a single harness for powering any number of tubs 38, 42 in parallel or in any other manner. With continued reference to FIG. 7, the front harness 1012 includes a proximal harness component 1040 coupled to the switch 1010, a distal harness component 1050 coupled to the proximal harness component 1040, a single lamp 1060 coupled to the proximal harness component 1040, and three lamps 1060 coupled to the distal harness component 1050. The rear harness 1014 includes a proximal harness component 1040 coupled to the switch 1010, a distal harness component 1050 coupled to the proximal harness component 1040, a single lamp 1060 coupled to the proximal harness component 1040, and three lamps 1060 coupled to the distal harness component 1050. Other constructions include different numbers and arrangements of lamps 1060 than that illustrated.

The lamps 1060 in the illustrated embodiment are LED lamps, although it will be appreciated that any or all of the lamps 1060 can be of any type desired, including without limitation neon, halogen, xenon, high-intensity discharge, and incandescent lamps.

Figure 15:
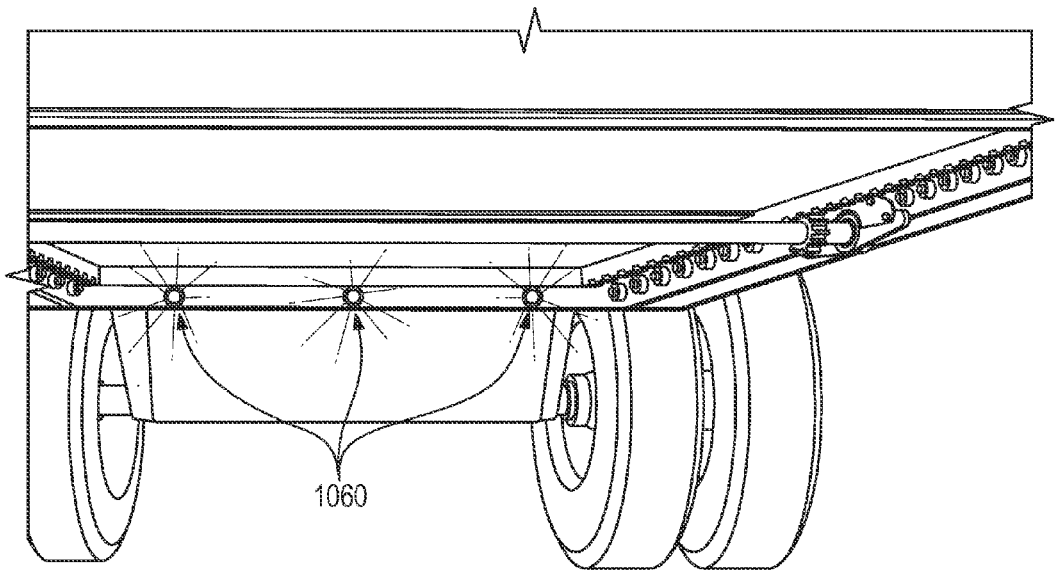

As illustrated in FIGS. 11, 12, and 15, the three LED lamps 1060 coupled to the distal harness component 1050 on the front harness 1012 are arranged to provide light to an area adjacent the opening 54 at the bottom of the front tub 38. Similarly, the three LED lamps 1060 coupled to the distal harness component 1050 on the rear harness 1014 are arranged to provide light to an area adjacent the opening 54 at the bottom of the rear tub 42.

The single LED lamp 1060 coupled to the proximal harness component 1040 on the front harness 1012 is arranged to provide light to an area adjacent the pinion 70 on the front tub 38, and to provide light for the driving member 74. Similarly, the single LED lamp 1060 coupled to the proximal harness component 1040 on the rear harness 1014 is arranged to provide light to an area adjacent the pinion 70 on the rear tub 42, and to provide light for the driving member 74.

Figure 9:
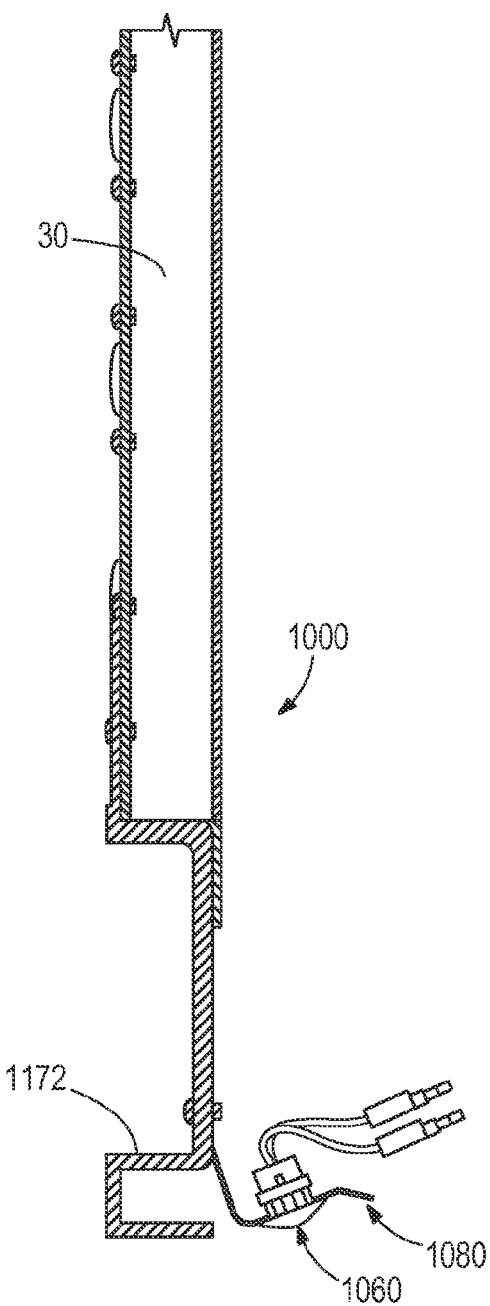
FIG. 9 is a cross-sectional view of a portion of the commodity trailer working area lighting system of FIGS. 6-8, illustrating an LED lamp disposed along a bottom rail of the trailer.
Figure 16:
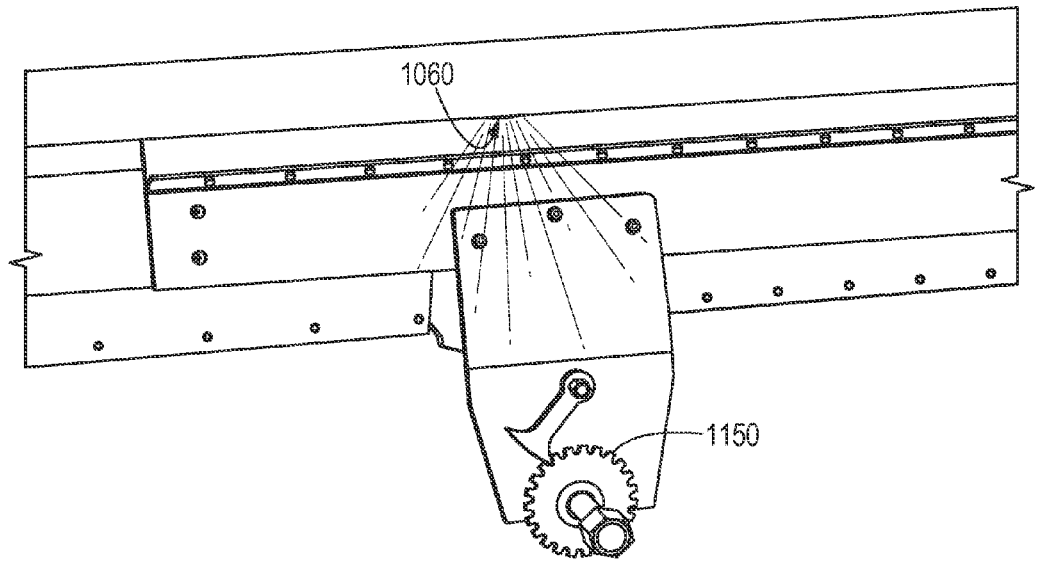
FIG. 16 is a perspective view of a door crank illuminated by an LED lamp of the commodity trailer working area lighting system.

With reference to FIGS. 7 and 9, each of the illustrated single LED lamps 1060 is coupled to the proximal harness component 1040 on the front harness 1012 and the rear harness 1014. In some embodiments, these single LED lamps 1060 are disposed within or otherwise mounted to brackets 1080 along the walls 30 of the trailer 10 (FIG. 9). For example, as illustrated in FIG. 9, in some embodiments the bracket 1080 is secured to an inside surface (i.e., away from the exterior of the trailer 10) of the lower rail 1172. The brackets 1080 can be angled as shown in FIG. 9, such that the single LED lamp 1060 directs light at an oblique angle (e.g., a downward angle) with respect to the ground toward the pinions 70, thereby illuminating the pinion 70 and/or the driving member 74 (for example as shown in FIG. 16).

With reference to FIG. 7, each of the LED lamps 1060 of the illustrated embodiment is controlled via the switch 1010. The LED lamps 1060 in each of the front and rear harnesses 1012, 1014 are arranged in series, although other (e.g., parallel) electrical arrangements are possible. In the illustrated embodiment the switch 1010 is operable to turn the LED lamps 1060 on the front harness 1012 either all on or all off at once. Similarly, in the illustrated embodiment the switch 1010 is operable to turn the LED lamps 1060 on the rear harness 1014 either all on or all off at once. In other embodiments one or more such switches 1010 are operable to control each LED lamp 1060 individually, or to have other variations of control over the LED lamps 1060 (e.g., the crank LED lamps 1060 independently of the tub LED lamps 1060, and/or the LED lamp(s) 1060 of one tub 38 independently of the LED lamp(s) 1060 of another tub 42, and the like). In some embodiments the switch 1010 or another user-operable control is operable to vary the brightness of one or more of the LED lamps 1060.

The illustrated trailer 10 utilizes a common 7-way plug (not shown) in a tractor coupled to the trailer 10 to power the LED lamps 1060. Thus, no additional or auxiliary plug is required to power the LED lamps 1060 in the commodity trailer working area lighting system 1000, although in other constructions other power sources are used (e.g., a dedicated battery that in some embodiments can be rechargeable).

The LED lamps 1060 can be part of an overall LED lighting circuit for the trailer 10, in which additional LED lamps are used to provide lighting on and around the trailer 10. The switch 1010 can provide independent control of the commodity trailer working area lighting system 1000 separate from other LED lamps in an overall LED lighting circuit.

With reference to FIGS. 8, 11, 12, and 15, in some embodiments the commodity trailer working area lighting system 1000 includes a respective frame 1082 located adjacent each tub 38, 42 (e.g., mounted directly to or adjacent the tub 38, 42, or integrally formed as part of the tub 38, 42). In some embodiments the frame 1082 functions as a mount for one or more of the LED lamps 1060 used to illuminate a work area beneath the opening 54 of the tub 38, 42. The frame 1082 can be located adjacent any side or sides of the opening 54, and in some embodiments can be located adjacent all sides of the opening 54. In this regard, the frame 1082 can extend alongside one or more sides of the opening 54, such as running parallel to any or all of the sides of the opening 54. In some embodiments (e.g., the illustrated embodiments), the frame 1082 is located on only one side of the opening 54. In some embodiments, the frame 1082 is located on a side of the opening opposite the side where the door 58 moves when the door 58 is opened (e.g., adjacent the stop member 82, by way of example, as illustrated in FIGS. 11, 12, and 15).

Figure 8:
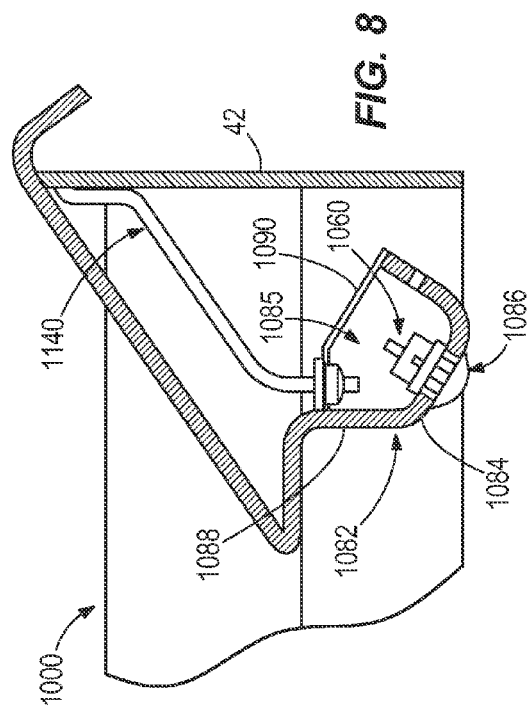
FIG. 8 is a cross-sectional view of a portion of the commodity trailer working area lighting system of FIGS. 6 and 7, illustrating an elongate enclosure for holding one of the harnesses and LED lamps.

The frame 1082 can have any shape suitable for mounting one or more LED lamps 1060 thereto in a manner described in more detail below. In some embodiments, the frame 1082 is a beam extending along a side of the opening 54. The beam 1082 can have any cross-sectional shape desired, such as a rectangular, square, I, T, L, irregular, or other cross-sectional shape. With reference to FIG. 8, the beam 1082 in the illustrated embodiment has a cross-sectional shape defining a flange used for mounting the beam 1082 to the tub 42 and a body extending from the beam to which the LED lamps 1060 are mounted. In the illustrated embodiment, the body of the beam 1082 is or at least partially defines an enclosure or enclosed space. The enclosure or enclosed space can also be at least partially defined by other structures of the trailer 10, such as by a wall 46 of the tub 38, 42 located above the beam 1082. Alternatively, the enclosure or enclosed space can be completely defined by the beam 1082, such as by a channel of the beam 1082, the interior area of a rectangular or square beam 1082, and the like.

In the trailer 10 of the illustrated embodiment, one beam 1082 is mounted adjacent the front tub 38 and another beam 1082 is mounted adjacent the rear tub 42. Each of the beams 1082 extends along a width of the trailer 10 (i.e., in a direction into the page of FIG. 6, or transverse to a driving direction of the trailer 10). The beam 1082 can be mounted so that at least a portion or the entire beam 1082 is located at an elevation that is lower than the opening 54, thereby positioning the LED lamps 1060 mounted thereto at an elevation that is lower than the opening 54. Such a positioning can improve the positions of the LED lamps 1060 (which are laterally positioned with respect to the opening 54 in the illustrated embodiment) to be able to shine upon a work area located beneath the opening 54 and/or to illuminate the tub 34, 42, the door 58, and/or the lip 86. In some embodiments, the beam 1082 is mounted directly to a wall 46 of the tub 38, 82, such as by welding, fastening, and the like.

With continued reference to FIGS. 8, 11, and 12, each beam 1082 in the illustrated embodiment includes an angled surface 1084 to which the LED lamps 1060 are mounted. Described in another manner, the surface 1084 is oriented at an oblique angle with respect to the ground. Any number of the LED lamps 1060 (three in the illustrated embodiment) can be mounted to the surface 1084 in a number of different manners, such as by one or more screws, rivets, or other fasteners, by a threaded connection between each LED lamp 1060 and a respective threaded hole in the beam 1082, by adhesive or cohesive bonding material, and the like. In the illustrated embodiment each LED lamp 1060 is received within a respective hole in the beam 1082 and is retained therein by a nut, clip, spring, or other retainer on an opposite (e.g., rear) side of the angled surface 1084. By virtue of being mounted on the angled surface 1084 of the beam 1082, the LED lamps 1060 are oriented at an oblique angle with respect to the ground (e.g., downward and inwardly toward a center of the trailer 10). However, it will be appreciated that in other embodiments, the LED lamps 1060 can be mounted to one or more surfaces 1084 of the beam 1082 that are not oblique with respect to the ground, in which cases the LED lamps 1060 can be mounted to the surface(s) 1084 in an angled orientation so that they are still directed (i.e., cast light) at an oblique angle with respect to the ground.

With continued reference to FIGS. 8, 11, 12, and 15, the beam 1082 in the illustrated embodiment contains three openings 1086 through which the three LED lamps 1060 extend. FIG. 11 shows two of the three LED lamps 1060 turned on, whereas FIG. 15 shows all three LED lamps 1060 turned on. The openings 1086 are generally spaced equally apart from one another along the angled surface 1084. As illustrated in FIG. 8, the illustrated beam 1082 further includes sidewalls 1088 extending from the angled surface 1084, and a cover 1090 that extends over the sidewalls 1088 to fully (or at least substantially) enclose the rear of each of the LED lamps 1060 and define enclosures 1085 for the LED lamps 1060.

With continued reference to FIGS. 7 and 8, in the illustrated embodiment the front and rear harnesses 1012, 1014 extend through their respective beams 1082 (i.e., through their respective enclosures 1085). At ends of the enclosures 1085 the harnesses 1012, 1014 extend out of the enclosures 1082 and become surrounded by a tube 1140 that is caulked and held in place against the tub 38, 42. The tube 1140 provides a pathway for the harnesses 1012, 1014 to extend to the switch 1010. In other embodiments, the tube 1140 is eliminated, and the harnesses 1012, 1014 extend away from the beams 1082 and are secured in place to the tubs 38, 42 or other trailer structure in any other manner desired. The illustrated harnesses 1012, 1014 extend to and are electrically connected to the distal harness components 1050 as described above.

With reference to FIGS. 11 and 12, the beams 1082, as well as the LED lamps 1060, are arranged in close proximity to the doors 58, with the LED lamps 1060 angled toward respective working areas beneath the openings 54 so as to provide improved lighting and visibility to the working areas (and in some cases, the doors 58 and/or openings 54 when the doors 58 are open). As illustrated in FIGS. 11 and 12, for example, the beam 1082 and LED lamps 1060 are disposed adjacent the stop member 82 and lip 86, such that the LED lamps 1060 shine light directly below and past the stop member 82 and into an area directly below the opening 54 and lip 86. In this manner, light from the LED lamps 1060 is not impeded or interrupted with shadows. The light remains bright and focused on the work area below the opening 54 where the door 58 is opening. Additionally, in some embodiments the LED lamps 1060 remain shielded and/or enclosed and protected by the beam 1082 (e.g., where the body of each LED lamp extends behind the surface 1084 as described above, and in some cases into an enclosed area as also described above.

Figure 17:
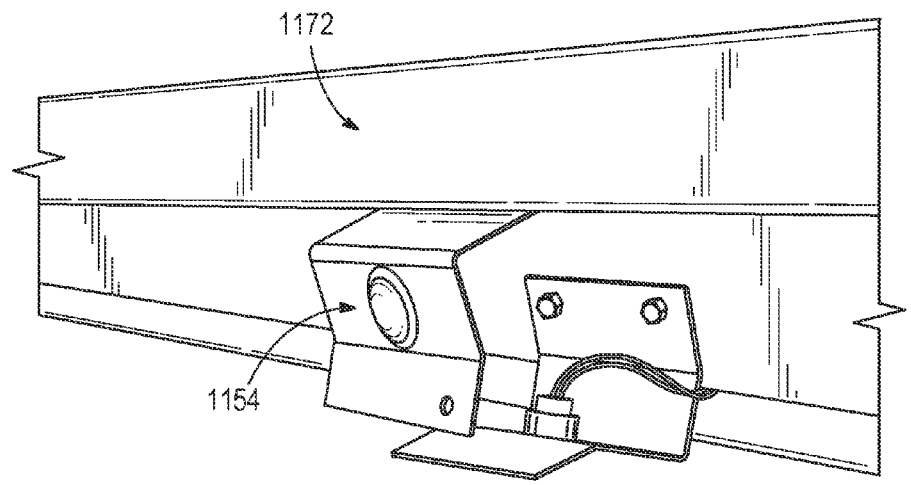
FIG. 17 is a perspective view of a door crank lamp bracket for securing an LED lamp of the commodity trailer working area lighting system to the commodity trailer.

With reference to FIGS. 16 and 17, in some embodiments the trailer 10 includes a door crank 1150 that includes its own dedicated LED lamp 1060 that provides lighting for an area surrounding the door crank 1150. In some constructions the LED lamp 1060 is part of the lighting system 1000 described above, and is one of a plurality of LED lamps 1060 on the trailer 10 that provide light around the working areas of the tub 38, 42. In other constructions the trailer 10 may include a lighting system 1000 that includes only a single LED lamp 1060 (e.g., the LED lamp 1060 illustrated in FIG. 16 for the door crank 1150). As illustrated in FIG. 17, in some constructions the LED lamp 1060 for the door crank 1150 includes its own lamp bracket 1154 mounted on or near the tub 38, 42 (e.g., to a location along an interior-facing side of the bottom rail 1172 as shown in FIG. 17) proximate the door crank 1150 to help support the LED lamp 1060.

Figure 18:
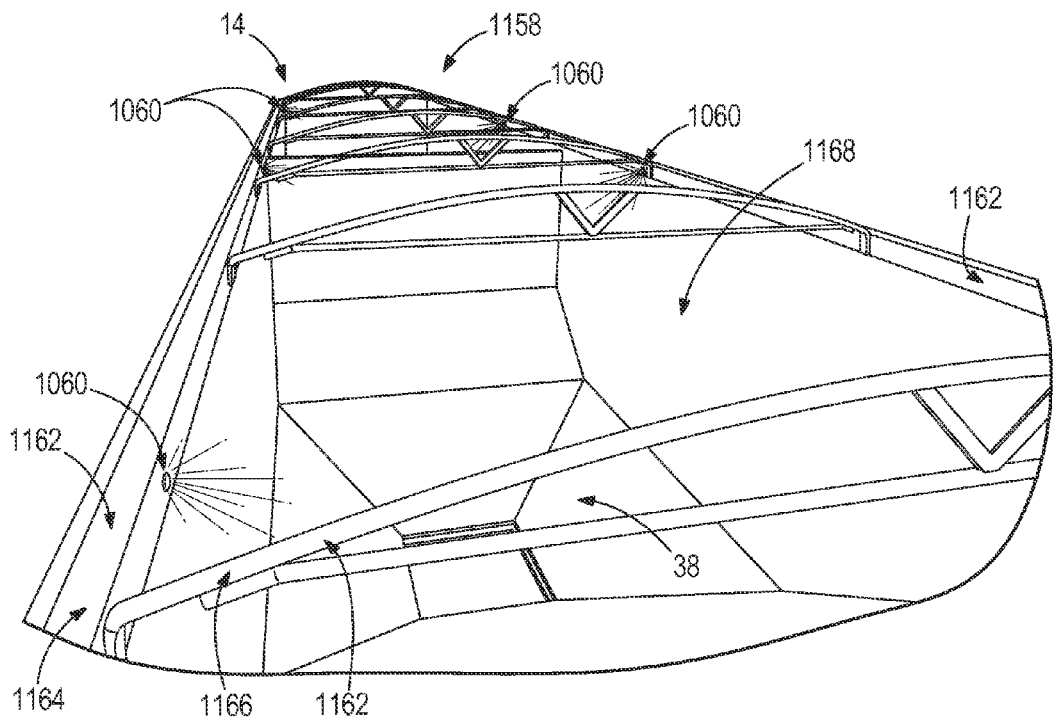
FIG. 18 is a perspective view of a top of a commodity trailer, illustrating a further lighting system for use along top rails of the commodity trailer.

With reference to FIG. 18, in some embodiments the trailer 10 includes a further lighting system 1158 (e.g., in addition to or alternatively from the lighting system 1000) to provide lighting along the top side 14 of the trailer 10. Similar to the lighting system 1000, the lighting system 1158 also includes a plurality of lamps 1060. Although the lamps 1060 in the illustrated embodiment of FIG. 18 are LED lamps, any other type of lamp (for example, those described above in connection with earlier embodiments) can instead be used. The illustrated LED lamps 1060 are coupled to top rails 1162 that define all or part of the top side 14 of the trailer 10. The LED lamps 1060 can be secured to the top rails 1162 by being mounted within the top rails 1162 with light exiting the top rails 1162 through holes in the top rails 1162 (e.g., in the same or similar manner to the openings 1086 in the frame 1082 described above), by being directly or indirectly secured to exterior surfaces of the top rails 1162 (e.g., fastened to the top rails 1162 or secured thereto via brackets in the same or similar manner as the by brackets 1080 as also described above), or in any other suitable manner. In the illustrated construction the top rails 1162 define an outer rectangular periphery or frame 1164 of the top side 14, as well as an arched lattice structure 1166 that extends over an interior 1168 of the trailer 10. The LED lamps 1060 shine light down into the interior 1168 (e.g., toward the tub 38, 42), to provide improved lighting and visibility to work areas in the trailer 10. For example, in some constructions the top rails 1162 include openings (e.g., cut-outs in the top rails 1162) that permit light to shine out from the LED lamps 1060 and into the interior 1168. In some constructions the LED lamps 1060 are mounted to the top rails 1162 in manner similar to that shown in FIG. 8 or FIG. 9.

The LED lamps 1060 are positioned proximate a top of the side walls 30 and/or on the top rails 1162 of the trailer 10 so that they shine light downward into the interior of the trailer 10 and/or laterally across the interior of the trailer, thereby in both cases illuminating the interior of the trailer. Accordingly the LED lamps 1060 shed light in a direction between and including a horizontally inward direction and a vertically downward direction, including any range or all of the included oblique angles therebetween.

In the illustrated embodiment a plurality of LED lamps 1060 are disposed along two opposing, parallel top rails 1162 that define part of the outer rectangular periphery or frame 1164. However, in other constructions the LED lamps 1060 are disposed along other areas of the periphery or frame 1164 or along the top rails 1162 of the lattice structure 1166. In some embodiments the lighting system 1158 is coupled to the same switch 1010 as the lighting system 1000 to be operated simultaneously with lighting system 1000.

With continued reference to FIG. 18, in some embodiments the lighting system 1158 is coupled to the trailer 10 in an integrated manner during manufacture of the trailer 10, such that the lighting system 1158 comes as standard equipment on the trailer 10. In other constructions the lighting system 1158 is applied as a retro-fit to existing commodity trailers.

Figure 19:
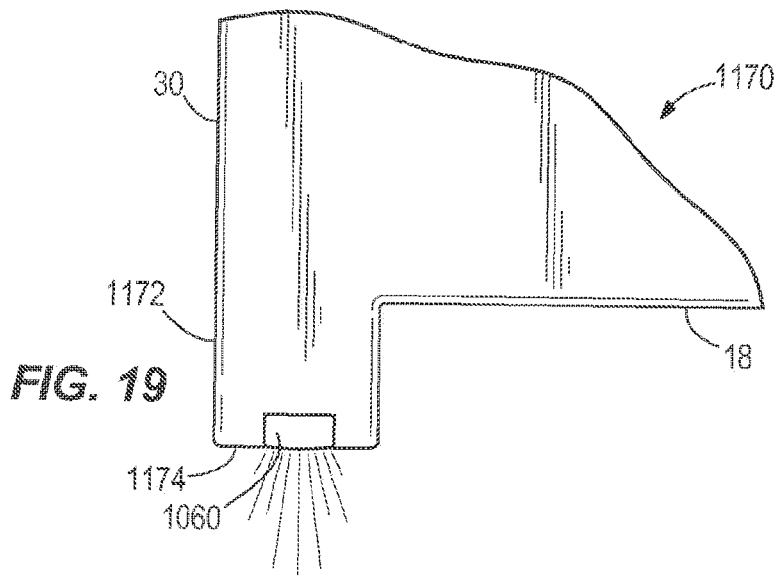
FIGS. 19-21 are schematic views of a further lighting system for use along bottom, outer rails of a commodity trailer.
Figure 20:
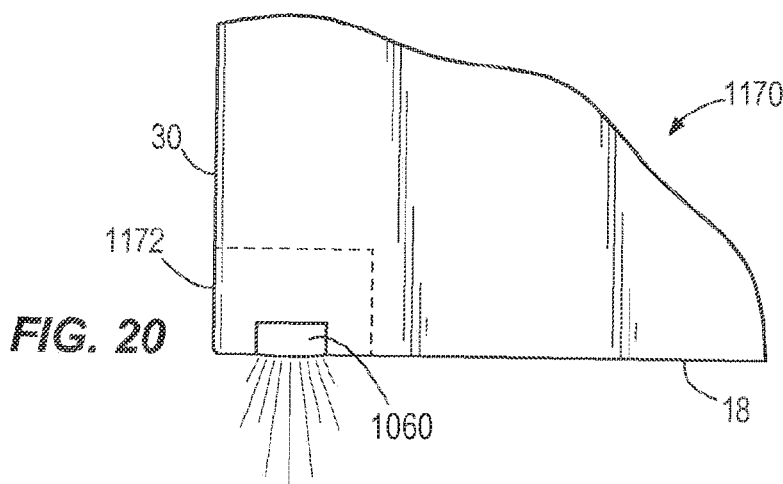
Figure 21:
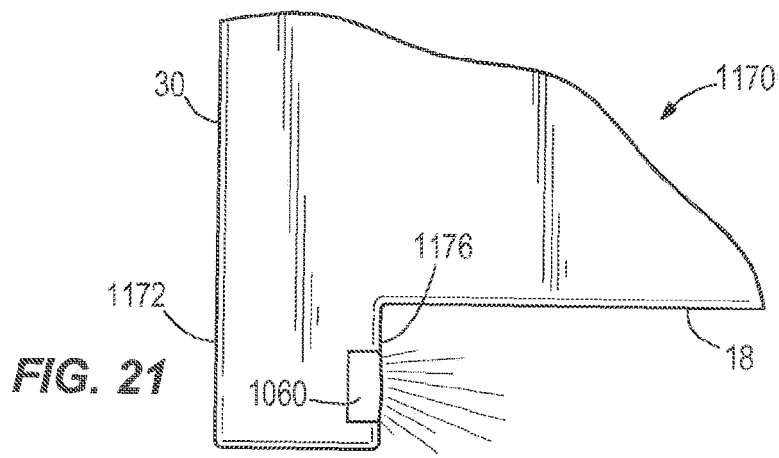

With reference to FIGS. 19-21, in some constructions the trailer 10 includes a further lighting system 1170 (e.g., in addition to or alternatively from lighting system 1000 and/or lighting system 1158). Similar to the lighting systems 1000, 1058 described above, the lighting system 1170 includes a plurality of lamps 1060. Although the lamps 1060 in the illustrated embodiments of FIGS. 19-21 are LED lamps, any other type of lamp (for example, those described above in connection with earlier embodiments) can instead be used. The LED lamps 1060 in FIGS. 19-21 are secured to one or more lower rails 1172 extending along a bottom of the trailer 10. In some constructions the lower rail 1172 defines a lowermost portion of the outer side wall 30 of the trailer. The LED lamps can be coupled to the lower rails 1172 by being mounted within the lower rails 1172 with light exiting the lower rails 1172 through holes in the lower rails 1172 (e.g., in the same or similar manner to the openings 1086 in the frame 1082 described above), by being directly or indirectly secured to exterior surfaces of the lower rails 1172 (e.g., fastened to the lower rails 1172 or secured thereto via brackets in the same or similar manner as the by brackets 1080 as also described above), or in any other suitable manner.

In some constructions the lower rail 1172 is hollow and/or forms a channel, recess, or angle to receive at least one of the LED lamps 1060, as well as an opening (e.g., cut-out) to permit light to shine out of or from the lower rail 1172. In some constructions, for example as illustrated in FIGS. 19 and 21, the lower rail 1172 protrudes below the bottom side 18 of the trailer. The trailer 10 can include multiple lower rails 1172 that define a lower, outer rectangular periphery of frame on the bottom side 18 of the trailer 10.

With reference to FIG. 19, in some embodiments at least one LED lamp 1060 is received within the lower rail 1172, and projects light out of or from a bottom 1174 of the lower rail 1172 in a downward and/or inward direction toward the tub 38, the wheels 34, the pinion 70, the driving member 74, and/or other components along the bottom of the trailer 10. In some constructions the LED lamp 1060 directs light toward a ground surface (e.g., a road) beneath the trailer 10.

With reference to FIG. 20, in some embodiments the lower rail 1172 forms part of or is flush with the bottom side 18 of the trailer, and the LED lamp 1060 is disposed within and/or on the lower rail 1172 to direct light out in a downward and/or inward direction.

With reference to FIG. 21, in some embodiments the LED lamp 1060 is disposed within and/or on the lower rail 1172, and is positioned inwardly to project light from an interior-facing wall 1176 of the lower rail 1172.

In some embodiments, including any of the embodiments of FIGS. 19-21, the LED lamp 1060 is angled (e.g., similar to how the LED lamp 1060 is angled in FIGS. 8 and 9) to focus the light more directly in both a downward and inward direction to illuminate a ground surface beneath the trailer 10.

In some embodiments, the lighting system 1170 is coupled to the same switch 1010 as the lighting system 1000 and/or the lighting system 1158, to be operated along with lighting system 1000 and/or the lighting system 1158.

In some embodiments, the lighting system 1170 is coupled to the trailer 10 in an integrated manner during manufacture of the trailer 10, such that the lighting system 1170 comes as standard equipment on the trailer 10. In other constructions the lighting system 1170 is applied as a retro-fit to existing commodity trailers.

In yet other constructions, the trailer 10 and lighting systems described herein include at least one LEP lamp 1060 that is disposed elsewhere (e.g., physically within the inside 1168 of the trailer 10 along a bottom near the tub 38 or along a bottom near one of the lower rails 1072, such that the LED lamp 1060 shines light up and/or inwardly into the inside 1168). Various other locations for LED lamps 1060 are also possible, such as along inner sides of the walls 30, or along other walls and areas of the trailer 10, to provide added lighting as desired.

Various features and advantages of the invention are set forth in the following claims.

What is claimed is:

1. A commodity trailer for storage and transport of a commodity over ground, the commodity trailer comprising:
   a tub in which the commodity is stored and transported, the tub including at least one wall that is sloped from a first elevation to an opening of the tub at a second elevation lower than the first elevation to funnel the commodity toward the opening, the opening having a plurality of sides; and
   a lamp secured in place with respect to the opening, the lamp positioned proximate the opening of the tub and oriented with respect to the opening to direct light upon a working area directly beneath the opening, the working area being a space where commodity from the tub flows upon exiting the opening.

2. The commodity trailer of claim 1, wherein the lamp is oriented at an oblique angle with respect to the ground.

3. The commodity trailer of claim 1, wherein the lamp is located at a lower elevation than the opening.

4. The commodity trailer of claim 1, wherein the lamp is located laterally away from the opening.

5. A commodity trailer for storage and transport of a commodity, the commodity trailer comprising:
   a tub in which the commodity is stored and transported, the tub including at least one wall that is sloped from a first elevation to an opening of the tub at a second elevation lower than the first elevation to funnel the commodity toward the opening, the opening having a plurality of sides;
   a frame extending along at least one side of the opening; and
   a lamp mounted to the frame, the lamp positioned proximate the opening of the tub and oriented with respect to the opening to direct light upon a working area directly beneath the opening, the working area being a space where commodity from the tub flows upon exiting the opening.

6. The commodity trailer of claim 5, wherein the frame comprises an elongated beam.

7. The commodity trailer of claim 6, wherein the elongated beam extends along an underside of the commodity trailer and laterally with respect to a direction of travel of the commodity trailer.

8. The commodity trailer of claim 5, wherein the frame at least partially defines an enclosure.

9. The commodity trailer of claim 5, wherein the lamp is an LED light.

10. The commodity trailer of claim 5, wherein the frame extends to a lower elevation than the opening.

11. The commodity trailer of claim 5, wherein the frame is located beneath the at least one wall of the tub.

12. The commodity trailer of claim 5, wherein the frame is coupled to the tub proximate the opening.

13. The commodity trailer of claim 6, further comprising electrical wire running within the elongated beam to the lamp.

14. A lighting system for a commodity trailer having a tub in which a commodity is stored and transported over ground, the lighting system comprising:
   an elongated beam having a cross sectional shape that includes a mounting flange shaped to secure the elongated beam in a position proximate an opening at the bottom of the tub where commodity from the tub flows out upon exiting the tub, and a body extending away from the mounting flange; and
   a light mounted to the body of the elongated beam;
   wherein the elongated beam is shaped to position the light proximate the opening of the tub and to orient the light at an oblique angle with respect to the ground when the elongated beam is secured in the position adjacent the tub via the mounting flange, such that the light shines upon a working area directly beneath the opening of the tub.

15. The lighting system of claim 14, wherein the light is received within an enclosure at least partially defined by the elongated beam.

16. A commodity trailer in which a commodity is stored and transported over ground, the commodity trailer comprising:
   a body having a top side, a bottom side, and side walls extending between the top side and the bottom side, wherein the top side, bottom side, and the side walls at least partially define an interior of the body, and wherein at least a portion of the top side of the body defines an opening, such that the interior is exposed to an outside environment at the top side of the body;
   a tub forming part of the bottom side of the body, in which the commodity is stored and transported, the tub including at least one wall that is sloped from a first elevation to an opening of the tub at a second elevation lower than the first elevation to funnel the commodity from the interior of the body toward the opening;
   a plurality of wheels coupled to the bottom side of the body;
   a plurality of top rails that at least partially define a rectangular periphery of the top side; and
   a lighting system including a switch and a plurality of discrete light sources coupled to at least one of the top rails in locations spaced along the at least one of the top rails and positioned to direct light downward into the interior to illuminate the tub from within the commodity trailer, wherein the light sources are operated by the switch electrically coupled to the plurality of discrete lights,
   wherein the bottom side includes a plurality of lower rails that define a rectangular outer periphery of the bottom side, and wherein the lighting system further includes a second lamp that is coupled to one of the lower rails and is oriented to direct light at an oblique angle with respect to the ground to illuminate an area below the bottom side.

17. The commodity trailer of claim 16, wherein the top rails include two opposite, parallel rails, and wherein the lighting system includes a plurality of LED lamps coupled to both of the opposite, parallel rails that direct light down into the interior.

18. The commodity trailer of claim 16, wherein the second lamp is at least partially disposed within the lower rail.

19. The commodity trailer of claim 16, wherein the second lamp directs light onto the tub.

\* \* \* \* \*